(12) United States Patent
Pienimaa et al.

(10) Patent No.: US 8,629,855 B2
(45) Date of Patent: Jan. 14, 2014

(54) MULTIMODE APPARATUS AND METHOD FOR MAKING SAME

(75) Inventors: Seppo Pienimaa, Espoo (FI); Kong Qiao Wang, Beijing (CN)

(73) Assignee: Nokia Corporation, Espoo (FI)

( * ) Notice: Subject to any disclaimer, the term of this patent is extended or adjusted under 35 U.S.C. 154(b) by 739 days.

(21) Appl. No.: 12/744,952

(22) PCT Filed: Dec. 20, 2007

(86) PCT No.: PCT/IB2007/004034
§ 371 (c)(1),
(2), (4) Date: Oct. 21, 2010

(87) PCT Pub. No.: WO2009/068935
PCT Pub. Date: Jun. 4, 2009

(65) Prior Publication Data
US 2011/0032213 A1 Feb. 10, 2011

Related U.S. Application Data

(60) Provisional application No. 61/004,834, filed on Nov. 30, 2007.

(51) Int. Cl.
*G06F 3/042* (2006.01)
(52) U.S. Cl.
USPC ........... 345/175; 345/173; 345/176; 356/614; 359/569

(58) Field of Classification Search
USPC ........... 345/173–177; 356/614; 359/569, 850; 385/37
See application file for complete search history.

(56) References Cited

U.S. PATENT DOCUMENTS

| | | | | |
|---|---|---|---|---|
| 5,159,322 | A | 10/1992 | Loebner | 340/706 |
| 7,548,677 | B2 * | 6/2009 | Bathiche et al. | 385/129 |
| 2007/0070504 | A1 | 3/2007 | Akutsu et al. | 359/573 |
| 2007/0152985 | A1 * | 7/2007 | Ostergaard et al. | 345/176 |

FOREIGN PATENT DOCUMENTS

WO WO 97/43607 11/1997
WO WO 2007/003196 A2 1/2007

* cited by examiner

*Primary Examiner* — Kimnhung Nguyen
(74) *Attorney, Agent, or Firm* — Harrington & Smith (57) ABSTRACT

An apparatus operable in touch-input mode and scanning mode uses a light guide and a camera to look through a slanted facet at one corner of the light guide. The light guide has an upper surface for placing a touch object or an item for scanning. An angular sensitive grating is located on lower surface having fringes such that when a light beam directed from a location P on upper surface toward lower surface at a predefined direction, it is diffracted by the grating and guided toward the slanted facet. The diffracted beam exits the slanted facet at an exiting angle indicative of the location P. When an object or item is placed on upper surface, it causes changes in exit beam intensity. From exiting angles and intensity changes, a camera is able to locate touch objects or to acquire an image of the scanned item.

20 Claims, 5 Drawing Sheets

MULTIMODE APPARATUS AND METHOD FOR MAKING SAME

The present application claims the benefit of a U.S. Provisional Patent Application, Ser. No. 61/004,834, filed Nov. 30, 2007.

FIELD OF THE INVENTION

The present invention relates generally to a multimode apparatus and, more particularly, to a multimode apparatus that can be used as a touch input device in one mode and as a scanning device in another mode.

BACKGROUND OF THE INVENTION

Some electronic devices require an input device, such as a touch pad, for inputting graphical information. Typically a touch pad has a surface for allowing a user to touch the surface at one or more locations. Various sensing technologies have been developed to sense the touch locations.

It is desirable and advantageous to provide a multimode apparatus that can be used as an input device and as a scanning device, for example.

SUMMARY OF THE INVENTION

The present invention provides an apparatus operable in a touch-input mode and in a scanning mode. The apparatus uses a light guide having a first surface and a second surface, and a camera or optical sensing module to look into the light guide for providing signals indicative of what the camera sees on the first surface on the light guide. The light guide has a slanted facet at one of its corners. The light guide has a diffractive element located on the second surface. The diffractive element has one or more diffractive structures with a plurality of concentric fringes centered at that corner. The concentric fringes form an angular sensitive grating, such that when a light beam is directed from a location P on the first surface toward the second surface along a pre-defined direction or angle, the light beam is diffracted toward the first surface and guided in the light guide unit it exits through slanted facet at an exiting angle into the camera. The exiting angle can be used to determine the distance between the location P and a reference point near the corner. When an object is placed on the first surface, it may change the intensity of the exit beam. Based on the angular sensitive nature of the grating and the intensity change in the exit beam, the camera is able to detect the presence of a touch object when the apparatus is operated in the touch-input mode. Similarly, when a document is placed facedown on the first surface, the intensity variation is indicative of the text or drawing on the document in the scanning mode.

Thus, the first aspect of the present invention is an apparatus operable in a touch-input mode and in a scanning mode. The apparatus uses a light guide having a first surface and a second surface to allow a user to input information from the first surface when the apparatus is operated in the touch-input mode or to place an item for scanning when the apparatus is operated in the scanning mode. The second surface has an angular sensitive grating to diffract a light beam that is directed from the first surface toward the second surface at a pre-defined angle or direction. The diffracted beam is guided in the light guide and subsequently exits the light guide at an exiting angle through a slanted facet at one corner of the light guide. The exiting angle allows a camera to determine the distance of a touch object to a reference point based on the diffracted beam. When the apparatus is used in the scanning mode, the image of the scanned item placed on the first surface is acquired by the camera and analyzed by a processor.

In an embodiment of the first aspect of the invention, an apparatus comprises a light guide having a first surface and an opposing second surface, an optical sensing module for sensing light from the light guide and providing signals indicative of a light beam emerging from the light guide between the first surface and the second surface, and a processor, operatively connected to the optical sensing module, for detecting intensity variation in the light beam based on the signals, wherein the apparatus is operable in a first mode and a second mode, and wherein when the apparatus is operated in the first mode, the intensity variation is indicative of placing of one or more objects at the first surface, and when the apparatus is operated in second mode, the intensity variation is indicative of content on an item placed on the first surface.

In an embodiment of the first aspect of the invention, the light guide comprises a slanted facet located at a corner of the light guide, the slanted facet extending at least from the first surface toward the second surface, and a diffractive element provided on the second surface, the diffractive element comprising a plurality of fringes arranged such that when the light beam is directed from a location on the first surface toward the second surface at a predefined direction, the light beam is diffracted toward the first surface and guided in the light guide and subsequently exits the light guide through the slanted facet as an exit beam at an exiting angle, the exiting angle indicative of a distance between the location and a reference point at the corner.

In an embodiment of the first aspect of the invention, when an object is present at the location on the first surface, intensity of the exit beam is caused to change, and wherein the optical sensing module is configured for detecting the exit beam having the exiting angle and the change in the intensity of the exit beam, and the signals provided to the processor are indicative of the exiting angle and the change in the intensity of the exit beam, the processor configured for detecting presence of the object at the location and determining the distance from the location to the reference point based on the signals.

In an embodiment of the first aspect of the invention, the apparatus also includes a light source for providing illumination to the first surface, so as to allow the optical sensing module to detect presence of one or more objects at one or more locations on the first surface.

In an embodiment of the first aspect of the invention, the optical sensing module comprises a camera optically coupled to the slanted surface.

In an embodiment of the first aspect of the invention, when the apparatus is operated in the first mode, the processor is configured for determining presence of the one or more objects at one or more locations on the first surface.

In an embodiment of the first aspect of the invention, the processor is configured for determining the one or more locations in a time sequence so as to detect changes in the one or more locations responsive to movement of the one or more objects.

In an embodiment of the first aspect of the invention, the movement of the one or more objects is indicative of an input character, and the apparatus also includes a handwriting character recognition module for determining the input character based on the movement.

In an embodiment of the first aspect of the invention, the movement of the one or more objects is indicative of a tracking, and the processor is configured for determining a gesture or a sketch defined by the tracking.

In an embodiment of the first aspect of the invention, the predefined direction is substantially perpendicular to the second surface.

In an embodiment of the first aspect of the invention, when the apparatus is operated in the second mode, the processor is configured for detecting intensity variations in light directed from a plurality of locations on the first surface, and for determining the content on the item based on the intensity variations.

In an embodiment of the first aspect of the invention, the processor is configured for forming an image of the content on the item.

In an embodiment of the first aspect of the invention, the apparatus also includes a memory module for storing the image.

In an embodiment of the first aspect of the invention, the content comprises text having text characters, and the apparatus also includes an optical character recognition module for recognizing the characters.

In an embodiment of the first aspect of the invention, the apparatus also includes a display for displaying the image.

In an embodiment of the first aspect of the invention, the item comprises a substrate and the content comprises pigment areas distributed on the substrate, and the processor is configured to record the pigment areas on the substrate.

In an embodiment of the first aspect of the invention, the apparatus also includes a sensor for sensing the item placed on the first surface, the sensing module causing the apparatus to operate in the second mode based on the sensing.

In an embodiment of the first aspect of the invention, the apparatus comprises a mobile terminal.

The second aspect of the present invention is a method for operating an apparatus in a touch-input mode and in a scanning mode. The method comprises:

providing a light guide having a first surface and an opposing second surface;

providing an optical sensing module in relationship to the light guide for sensing light from the light guide and for providing signals indicative of a light beam emerging from the light guide; and providing the signals to a processor, the processor configured for detecting intensity variation in the light beam based on the signals, wherein when the apparatus is operated in the touch-input mode, the intensity variation is indicative of placing of one or more objects on the first surface, and when the apparatus is operated in the scanning mode, the intensity variation is indicative of content on an item placed on the first surface. The light guide comprises a slanted facet located at a corner of the light guide, the slanted facet extending at least from the first surface toward the second surface, and the optical sensing module is located at the slanted facet. The light guide has a diffractive element located on the second surface, the diffractive element comprising a plurality of fringes arranged such that when the light beam is directed from a location P on the first surface toward the second surface at a selected or predefined direction, the light beam is diffracted by the diffractive element toward the first surface and guided by the light guide until it exits the light guide through the slanted facet at an exiting angle indicative of a distance between the location P and a reference point at the corner.

The light guide is arranged such that when an object is present at a location on the first surface, the intensity of the exit beam is caused to change, and the optical sensing module is configured for detecting the exit beam having the exiting angle and the intensity change in the exit beam. Based on the exiting angle and the intensity change in the exit beam, the processor is able to determine the location and presence of the object at the location.

When the apparatus is operated in the touch-input mode, the processor is configured for determining the presence of one or more objects at one or more locations on the first surface. The one or more locations can be detected in a time sequence so as to detect the movement of the one or more objects.

When the apparatus is operated in the scanning mode, the light beam is indicative of intensity variations in light directed from a plurality of locations on the first surface, and the signals are indicative of the intensity variations. The processor is configured to determine the content of the item based on the signals and to form an image of the content of the item.

In an embodiment of the second aspect of the invention, the method comprises providing a light guide in an apparatus operable in a first mode and in a second mode, the light guide having a first surface and an opposing second surface, optically coupling an optical sensing module to the light guide for sensing light from the light guide and for providing signals indicative of one or light beams emerging from the light guide between the first surface and the second surface, and providing the signals to a processor, the processor configured for detecting intensity variation in the one or more light beams based on the signals, wherein when the apparatus is operated in the first mode, the intensity variation is indicative of placing of one or more objects on the first surface, and when the apparatus is operated in second mode, the intensity variation is indicative of content on an item placed on the first surface.

In an embodiment of the second aspect of the invention, the light guide comprises a slanted facet located at a corner of the light guide, the slanted facet extending at least from the first surface toward the second surface, and the optical sensing module is optically coupled to the slanted facet, and the method further includes providing a diffractive element on the second surface, the diffractive element comprising a plurality of fringes arranged such that when the light beam is directed from a location on the first surface toward the second surface at a predefined direction, the light beam is diffracted by the diffractive element toward the first surface and guided in light guide, and the diffracted light beam exits the slanted facet as an exit beam at an exiting angle, the exiting angle indicative of a distance between the location and a reference point at the corner.

In an embodiment of the second aspect of the invention, when an object is present at the location on the first surface, intensity of the exit beam is caused to change, and wherein the optical sensing module is configured for detecting the exit beam having the exiting angle and the change in the intensity of the exit beam, and the signals provided to the processor are indicative of the exiting angle and the change in the intensity of the exit beam, and the method further includes configuring the processor to determine the location and presence of the object at the location based on the signals.

In an embodiment of the second aspect of the invention, when the apparatus is operated in the first mode, the processor is configured for determining presence of the one or more objects at one or more locations on the first surface.

In an embodiment of the second aspect of the invention, the method further includes configuring the processor to determine the one or more locations in a time sequence so as to detect changes in the one or more locations responsive to movement of the one or more objects, and determining the movement of the one or more objects.

In an embodiment of the second aspect of the invention, when the apparatus is operated in the second mode, the light beam is indicative of intensity variations in light directed from a plurality of locations on the first surface, and the signals are indicative of the intensity variations, and the method further includes configuring the processor for determining the content of the item based on the signals and for forming an image of the content of the item.

In an embodiment of the second aspect of the invention, the content comprises text having text characters, and the method further includes recognizing the text characters.

The present invention will become apparent upon reading the description taken in conjunction with FIGS. 1 to 7.

DETAILED DESCRIPTION OF THE INVENTION

The multimode apparatus, according to various embodiments of the present invention, comprises an input device for gathering input information and one or more processors for processing the information. The input device comprises mainly a light guide and an optical sensing module coupled to a light guide. The light guide has a touch surface to allow a user to place an object on the touch surface at a location and the optical sensing module is configured to determine the touch location in relationship to a reference point. The optical sensing module, along with a process, can be used to track the touch location as a function of time. The movement of the touch location may be indicative of a gesture, a drawing or a handwritten character. The gesture or the handwritten character may be recognized using a handwriting character recognition module or a software program based on the movement.

The same light guide can be used for scanning a document, a picture or the like that is placed facedown on the light guide. The optical sensing module, along with the processor, can be used to acquire an image of the scanned document or picture, and store the image in a storage device. If the document or picture is larger than the surface of the light guide, the document may need to be scanned a number of times. Image stitching or image mosaic technique can be used to form the image of a full document, for example. Image layout analysis and pre-segmentation may be performed on the image to yield a preliminary processing result. An optical character recognition module can be used to recognize the text on the documents. The recognition process may include iterative character segmentation and recognition. That is, segmentation is for character recognition and the recognition result can be used to correct segmentation errors and to update previous recognition results.

In the touch-input mode as well as the scanning mode, language models and electronic dictionaries can be used to correct the recognized characters based on language syntax, language grammar, language habits and so on. The recognized characters or text can be displayed on a display panel so that the user can verify the characters and provide feedback on wrong recognition to the system so that the system can process the wrong recognition again. Part or all of the language models, electronic dictionaries, character recognition program can be embedded in one or more computer readable storage media.

Figure 1:
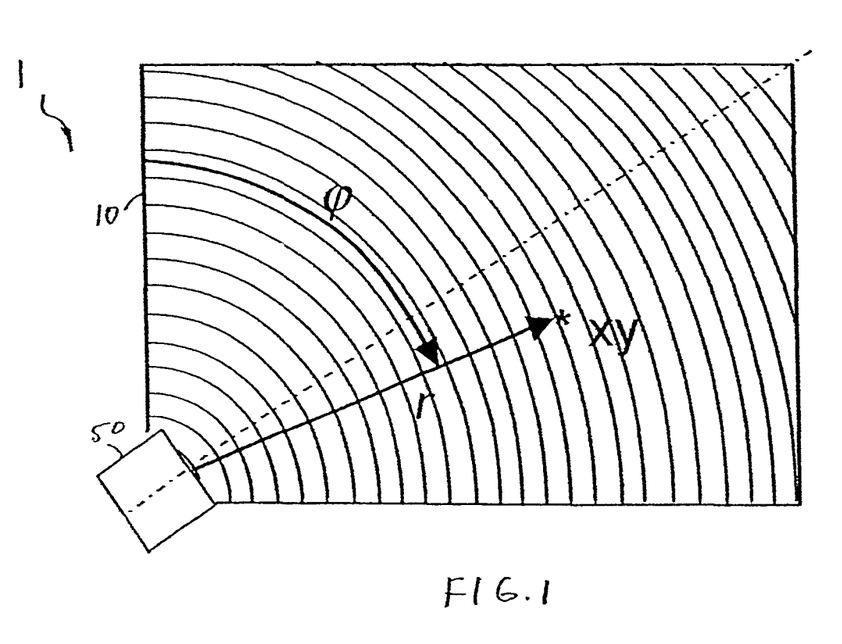
FIG. 1 shows a top-view of the input device, according to one embodiment of the present invention.

An exemplary input device for use in the multimode apparatus is shown in FIG. 1. The input device 1, according to one embodiment of the present invention, includes a light guide 10 and an optical sensing module, such as a camera 50 located at one corner of the light guide. The camera 50 is used to determine the location of a touch object placed on or near the surface of the light guide. As shown in FIG. 1, the location at a point (x, y) can be determined by the angle $\phi$ and the distance r:

$$x = r\sin\phi,$$

$$y = r\cos\phi$$

The light guide 10 has a diffractive element or one or more diffractive structures made of substantially concentric fringes centered at a point near or at the camera 50. The center of the concentric fringes can be located at a point of the camera aperture, for example, and used as a reference point for determining the distance r. One of the functions of the diffractive structures is to allow the camera to determine r.

Figure 2:
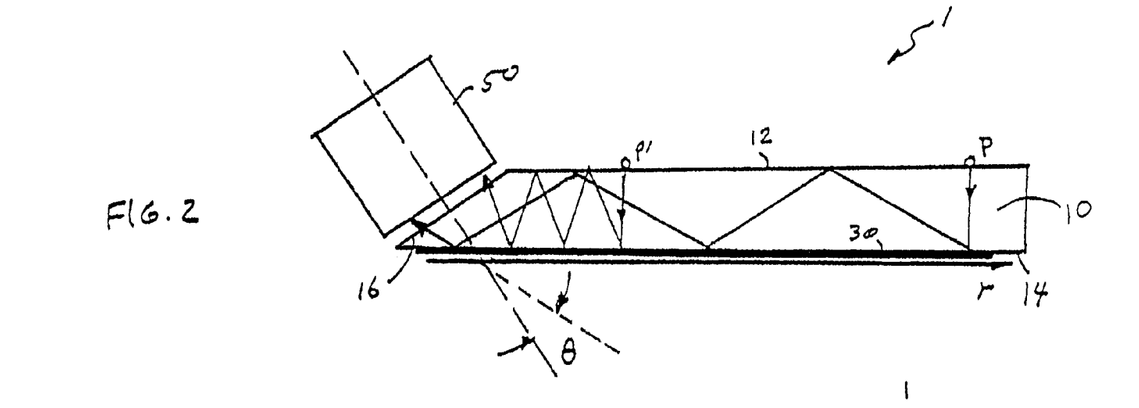
FIG. 2 shows a side view of the input device.

As shown in FIG. 2, the light guide 10 has a first surface 12 used as a touch input surface, and a second surface 14 for implementing the diffractive structures 30. The light guide 10 also has a slanted facet 16 extending from the first surface toward the second surface. The placement of the camera or optical sensing module 50 at the slanted facet 16 allows the camera 50 to "peer into" the light guide 10 through the slanted facet 16. In particular, the camera 50 is configured to see a large area of the first surface 12 from the inside of the light guide 10. As such, the camera 50 is able to detect one or more touch objects at one or more touch locations on the first surface 12.

According to one embodiment of the present invention, the concentric fringes in the diffractive structures 30 form an angular sensitive grating, such that a light beam directed from a location P on the first surface to another point on the second surface is more significantly diffracted toward the first surface by the diffractive structures 30 only when the beam counters the diffractive structures 30 at a predefined angle or direction. The diffracted beam may be reflected by the first surface a number of times before it exits through the slanted facet 16 an exiting angle $\theta$. For example, the beam that encounters the diffractive structures 30 at a 90 degree angle (or the beam direction is substantially perpendicular to the second surface) will be significantly diffracted and form an exiting beam, as shown in FIG. 2. The concentric fringes are arranged such that the exiting angle $\theta$ is related to the distance between the location P and the corner. As the distance is a function of the exiting angle $\theta$, a light beam enters or directed from the first surface at a different distance will exit the slanted facet 16 at a different exiting angle $\theta$. The camera 50 placed adjacent to the slanted facet 16 is configured to determine the distance of the directing point P at least partly based on the exiting angle $\theta$. Because the fringes are concentric about a point at the corner, the exiting angle $\theta$ does not vary with $\phi$. Thus, the distance r can be determined by $\theta$ and the thickness of the light guide 10, for example. From the angular information in $\theta$ and $\phi$, the camera 50 is able to determine the location of light directing point P on the first surface 10. Thus, the present invention uses the transformations $(\theta, \phi) \to (r, \phi)$ and $(r, \phi) \to (x,y)$ to determine the location of a touch event.

According to various embodiments of the present invention, the camera 50 is also configured to obtain the intensity of an exiting beam. When an object is present at a point P, the amount of light directed at that point may change. Thus, the optical sensing module or camera 50 is able to determine a touch event and the touch location from the change in the intensity of the exit beam.

Figure 3:
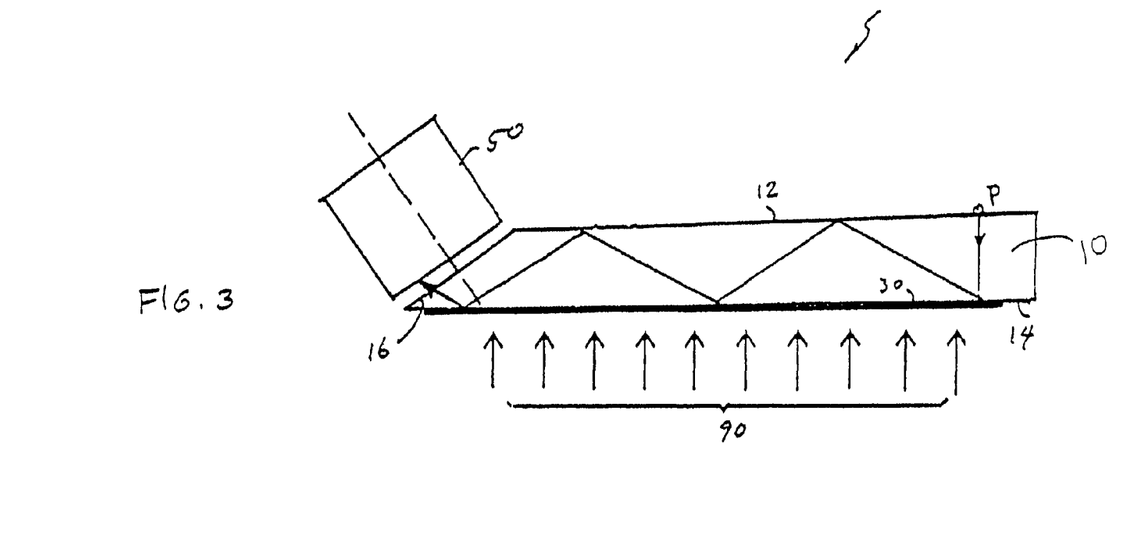
FIG. 3 shows a light beam for illuminating the input device.
Figure 4:
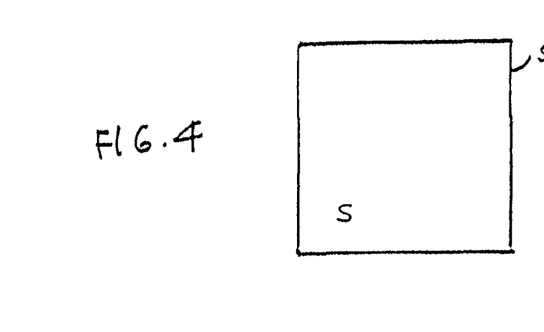
FIG. 4 shows an image having a spot resulting from a touch object on the device surface.

In one embodiment of the present invention, a light source having a broad light beam 90 is provided to illuminate the light guide 10 through the second surface 14 and the diffractive structures 30, as shown in FIG. 3. When the first surface 12 is not touched by any object, the camera 50 will see a blank image indicative of a distribution of light intensity partly resulting from the reflection of the light beam 90 by the first surface 12. When an object is present at the first surface, for example, a spot S would appear in the blank image 55, as shown in FIG. 4. The brightness or darkness of the spot is determined by the color, and the surface characteristics of the touch object. For example, if the touch object is white, highly reflective or light emitting, the spot is brighter than other areas of the image. If the touch object is black or light absorbing, the spot could be dark.

Figure 5:
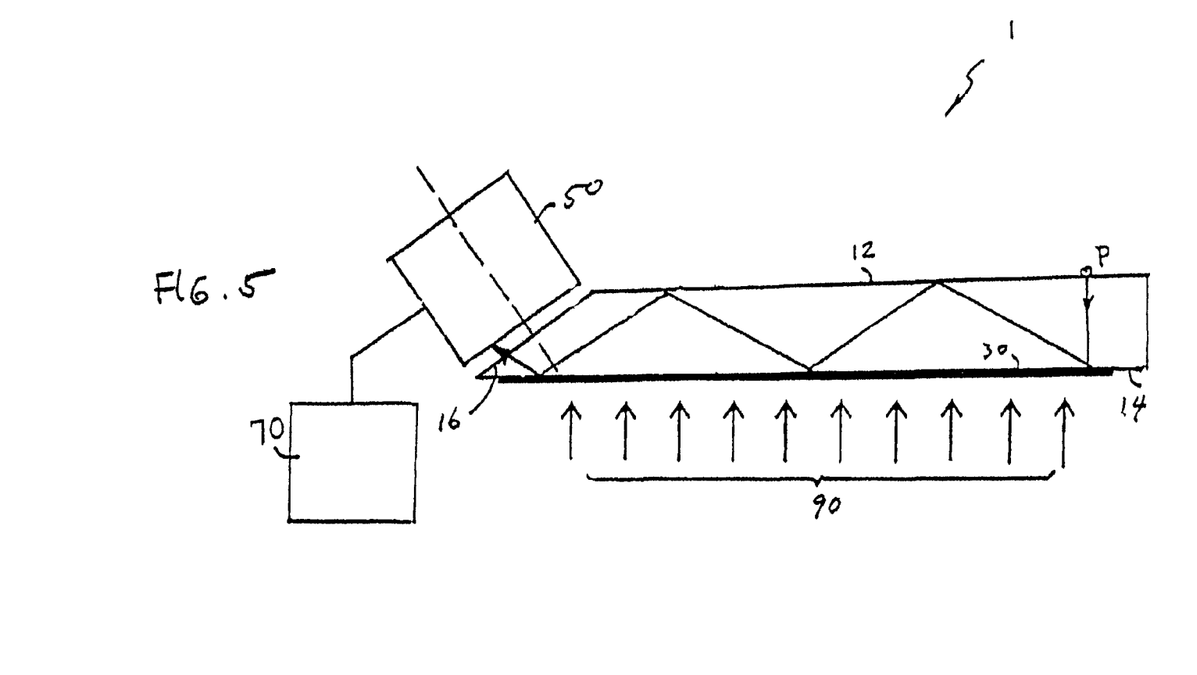
FIG. 5 shows a processor for determining the coordinate of the touch object.

Furthermore, the optical sensing module or camera 50, along with a processor 70 (see FIG. 5), can be configured to obtain the coordinates (x,y) of a touch object based on the exiting angle of the exit beam or the location of the spot S on the image 55.

In general, when a document is placed facedown on the first surface, for example, the drawing or text on the document also causes the change in the intensity of the exit beam. In order for the optical sensing module 50 to see a large part of the document covering the first surface, a light source is placed adjacent to the second surface to provide a broad light beam so that reflection from a large area of the first surface can be observed by the optical sensor module 50. In an indirect way, the broad light beam illuminates the document covering the first surface through the diffraction by the diffractive structure on the second surface. By detecting the light intensity at various reflection locations on the first surface, the optical sensing module is able to form an image of the document covering the first surface.

The placement of the optical sensing module in relationship to the slanted facet 16 allows the optical sensing module to "look into" the inside of the light guide 10. With a broad light beam illuminating the first surface and the objects placed on the first surface from the outside of the light guide, the optical sensing module is able to see the reflection from a large part of the first surface and form an image of the objects or a document placed on the first surface.

Accordingly, the input device 1 can be used as a touch input device and as a scanning device. By using such an input device, the multimode apparatus is operable at least in two modes: a first mode as a touch input device and a second mode as a scanning device. The optical sensing module can be coupled to a processor so that the coordinates (x, y) of one or more touch objects can be computed and an image of a scanned document can be obtained.

Figure 6:
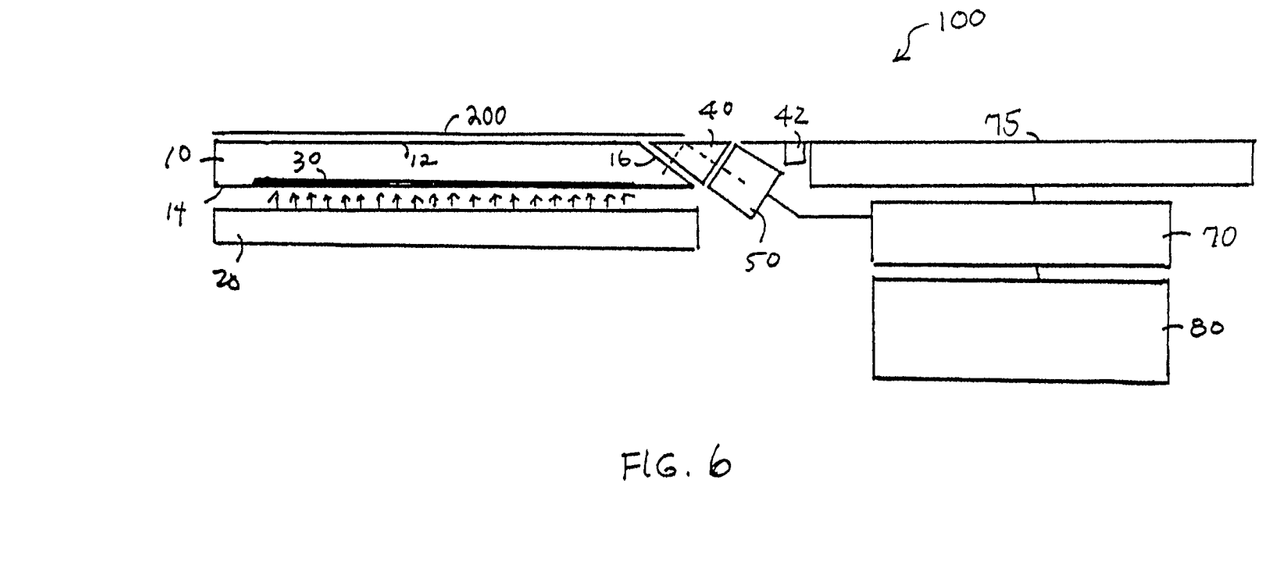
FIG. 6 is a schematic representation of a multimode apparatus, according to one embodiment of the present invention.

The multimode apparatus, according to one embodiment of the present invention, comprises a light source for illumination. As shown in FIG. 6, the multimode apparatus 100 has a light source 20 with a broad light beam to illuminate the light guide 10 through the second surface 14 and the diffractive structures 30. Instead of placing the optical sensing module or camera 50 directly adjacent to the slanted facet 16 as shown in FIG. 2, a light reflector or deflector 40 can be used to direct the light beam exiting the slanted facet 16 to the optical sensing module 50. As such, the optical sensing module 50 will not obstruct the scanning operation. In one embodiment of the present invention, the multimode apparatus has a switch (not shown) or the like to allow a user to choose between a touch-input mode and a scanning mode. Alternatively, a sensing device 42 is placed near the first surface 10 to detect whether a document 200 or the like is covering the first surface for scanning.

The optical sensing module or camera 50, along with a processor 70 can be configured to obtain the touch locations when the multimode apparatus 100 is operated in the touch-input mode. The optical sensing module 50 can be configured to detect the touch locations in a time sequence. As such, the optical sensing module is able to detect the movement of the touch object or objects. The movement of a touch object may be indicative of a drawing by a user using the touch object as a drawing tool. The movement can be indicative of a gesture. The processor 70 may include a software program for drawing recognition, a software program for handwriting recognition, and so on (see FIG. 7). When the multimode apparatus 100 is operated in the touch-input mode, it is possible to use an infrared light source in the vicinity of the camera aperture or other locations to illuminate the touch objects, for example. As such, the touch-input mode can be used under ambient light and the optical sensing module 50 is configured for detecting the changes in the infra red light at various locations on the first surface 12. The touch locations or the drawing or gesture can be displayed on a display panel 75, for example.

Figure 7:
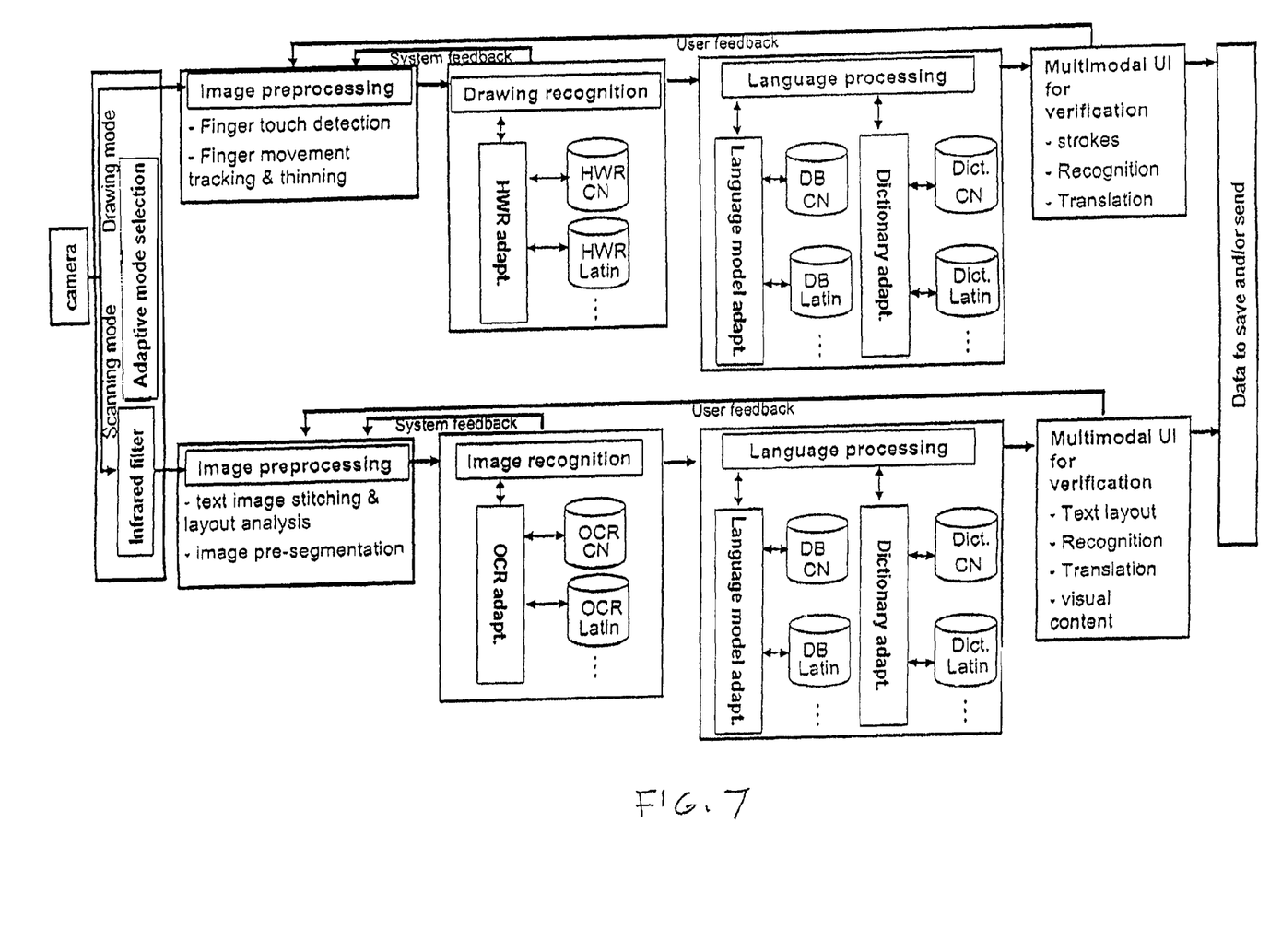
FIG. 7 shows an exemplary architecture of the multimode apparatus, according to one embodiment of the present invention.

When the multimode apparatus 100 is operated in the scanning mode, the image formed by the optical sensing device can be stored in a memory 80 and displayed on the display panel 75, for example. The processor 70 may have a software program for text image stitching and layout analysis. This function is useful when the scanned document is larger than the first surface 12 of the light guide 10 and it may be necessary to scan a portion of the document at a time. The processor 70 may have an optical character recognition software program for character recognition (Chinese, Latin, Japanese, Greek, etc.). After the scanned characters are recognized, a language-processing module can be used to correct the recognized characters based on language syntax, language grammar and so on. The language-processing module may have one or more language modules and dictionaries.

In the scanning mode, the optical sensing device can be used to read or record a document, a drawing, a picture, a barcode, a business card, and an identification card to be authenticated, for example. Any one of the above-listed items can be generalized as a substrate having a distribution of pigment areas on the substrate surface. For example, if the scanned item is a line drawing on a piece of paper in red ink, then the paper is the substrate, and the drawing can be viewed as having an amount of red pigment distributed along the drawing line or lines.

In sum, the present invention provides an apparatus operable in a touch-input mode and a scanning mode, the apparatus comprises:

a light guide having a first surface and an opposing second surface for guiding light at least between the first surface and the second surface;

an optical sensing module for sensing light from the light guide and providing signals indicative of a light beam emerging from the light guide; and a processor, operatively connected to the optical sensing module, for detecting intensity variation in the light beam based on the signals, wherein when the apparatus is operated in the touch-input mode, the intensity variation is indicative of placing of one or more objects on the first surface, and when the apparatus is operated in scanning mode, the intensity variation is indicative of the content on an item placed on the first surface for scanning.

According to one embodiment of the present invention, the light guide comprises:

a slanted facet located at a corner of the light guide, the slanted facet extending at least from the first surface toward the second surface, wherein the optical sensing module is located at the slanted facet; and a diffractive element located on the second surface, the diffractive element comprising a plurality of fringes arranged such that when the light beam is directed from the first surface at a location P toward the second surface at a selected or predefined direction, the light beam is diffracted by the diffractive element toward the first surface and is guided in the light guide until it exits the light guide through the slanted facet as an exit beam with an exiting angle, the exiting angle indicative of a distance between the location P and a reference point at the corner. The predefined direction is substantially perpendicular to the second surface, for example.

In the apparatus, the light guide is arranged such that when an object is present at a location on the first surface, the intensity of the exit beam is caused to change, and the optical sensing module is configured for detecting the exit beam having the exiting angle and the change in the intensity of the exit beam, and the signals provided to the processor are indicative of the exiting angle and the change in the intensity of the exit beam. Based on the signals, the processor determines the presence of the object at that location.

The apparatus may have a light source for providing illumination to the first surface, so as to allow the optical sensing module to detect the presence of one or more objects at one or more locations on the first surface. The optical sensing module can be a camera having an aperture, and the reference point can be located at the aperture, for example.

When the apparatus is operated in the touch-input mode, the processor is configured for determining the presence of the one or more objects at one or more locations on the first surface in a time sequence so as to detect the movement of the one or more objects.

According to one embodiment of the present invention, the movement of the one or more objects is indicative of an input character, and the apparatus further comprises a handwriting character recognition module for determining the input character based on the movement. The movement can also be indicative of a gesture or a sketch.

According to one embodiment of the present invention, when the apparatus is operated in the scanning mode, the light beam is indicative of intensity variations in light directed from a plurality of locations on the first surface, and the signals are indicative of said intensity variations. Based on the signals, the processor determines the content on the item, and forms an image of the item. The image can be stored in a memory module and/or displayed on a display panel, for example. When the item is a document containing text as its content, the apparatus also has an optical character recognition module for recognizing characters in the text.

According to one embodiment of the present invention, the item is a picture, and the processor is configured to record the picture.

According to one embodiment of the present invention, a sensor can be used to sense the item placed on the first surface for scanning, and the sensor can cause the apparatus to operate in the scanning mode when the item is present.

The present invention also provides a method for operating an apparatus in a touch-input mode and in a scanning mode. The method comprises:

providing a light guide having a first surface and an opposing second surface;

providing an optical sensing module in relationship to the light guide for sensing light from the light guide and for providing signals indicative of a light beam emerging from the light guide; and providing the signals to a processor, the processor configured for detecting intensity variation in the light beam based on the signals, wherein when the apparatus is operated in the touch-input mode, the intensity variation is indicative of placing of one or more objects on the first surface, and when the apparatus is operated in scanning mode, the intensity variation is indicative of the content on an item placed on the first surface for scanning. The light guide comprises a slanted facet located at a corner of the light guide, the slanted facet extending at least from the first surface toward the second surface, and the optical sensing module is located at the slanted facet. The light guide has a diffractive element located on the second surface, the diffractive element comprising a plurality of fringes arranged such that when the light beam is directed from the first surface at a location P toward the second surface at a predefined direction, the light beam is diffracted by the diffractive element toward the first surface. The diffracted beam is guided in the light guide and subsequently exits the light guide through the slanted facet as an exit beam at an exiting angle, the exiting angle indicative of a distance between said location and a reference point at said corner. The predefined direction is substantially perpendicular to the second surface, for example.

The apparatus can be a stand-alone device, or integrated into a mobile phone or the like. The fringes on the diffractive element or structures can be interference fringes or grooves on a surface.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. An apparatus, comprising: a light guide having a first surface and an opposing second surface, comprising: a facet extending at least from the first surface toward the second surface, and a diffractive element provided on the second surface, the diffractive element comprising a plurality of fringes arranged such that when the light beam is directed from a location on the first surface toward the second surface at a redefined direction, the light beam is diffracted toward the first surface and guided in the light guide and subsequently exits the light guide through the facet as an exit beam at an exiting angle, the exiting angle being indicative of a distance between said location and a reference point;

an optical sensing module for sensing light from the light guide and providing signals indicative of a light beam emerging from the light guide between the first surface and the second surface; and a processor, operatively connected to the optical sensing module, for detecting intensity variation in the light beam based on the signals, wherein the apparatus is operable in a first mode and a second mode, and wherein when the apparatus is operated in the first mode, the intensity variation is indicative of placing of one or more objects at the first surface, and when the apparatus is operated in second mode, the intensity variation is indicative of content on an item placed on the first surface.

2. The apparatus of claim 1, wherein the the facet is a slanted facet located at a corner of the light guide, and said reference point is located at said corner.

3. The apparatus of claim 2, wherein when an object is present at said location on the first surface, intensity of the exit beam is caused to change, and wherein the optical sensing module is configured to detect the exit beam having the exiting angle and the change in the intensity of the exit beam, and the signals provided to the processor are indicative of the exiting angle and the change in the intensity of the exit beam, the processor configured to detect presence of the object at said location and determining the distance from said location to the reference point based on the signals.

4. The apparatus of claim 3, further comprising a light source for providing illumination to the first surface, so as to allow the optical sensing module to detect presence of one or more objects at one or more locations on the first surface.

5. The apparatus of claim 2, wherein the optical sensing module comprises a camera optically coupled to the slanted surface.

6. The apparatus of claim 3, wherein when the apparatus is operated in the first mode, the processor is configured to determine presence of the one or more objects at one or more locations on the first surface.

7. The apparatus of claim 6, wherein the processor is configured to determine the one or more locations in a time sequence so as to detect changes in said one or more locations responsive to movement of said one or more objects.

8. The apparatus of claim 2, wherein when the apparatus is operated in the second mode, the processor is configured to detect intensity variations in light directed from a plurality of locations on the first surface, and for determining the content on the item based on the intensity variations.

9. The apparatus of claim 8, wherein the processor is configured to form an image of the content on the item.

10. The apparatus of claim 8, wherein the content comprises text having text characters, said apparatus further comprising: an optical character recognition module for recognizing the characters.

11. The apparatus of claim 8, wherein the item comprises a substrate and the content comprises pigment areas distributed on the substrate, and the processor is configured to record the pigment areas on the substrate.

12. The apparatus of claim 1, wherein the predefined direction is substantially perpendicular to the second surface.

13. The apparatus of claim 1, further comprising: a sensor for sensing the item placed on the first surface, the sensing module causing the apparatus to operate in the second mode based on said sensing.

14. The apparatus of claim 1, comprising a mobile terminal.

15. A method, comprising: providing a light guide in an apparatus operable in a first mode and in a second mode, the light guide having a first surface and an opposing second surface comprising a facet extending at least from the first surface toward the second surface, and a diffractive element provided on the second surface, the diffractive element comprising a plurality of fringes arranged such that when the light beam is directed from a location on the first surface toward the second surface at a predefined direction, the light beam is diffracted toward the first surface and guided in the light guide and subsequently exits the light guide through the facet as an exit beam at an exiting angle, the exiting angle being indicative of a distance between said location and a reference point;
optically coupling an optical sensing module to the light guide for sensing light from the light guide and for providing signals indicative of one or light beams emerging from the light guide between the first surface and the second surface; and
providing the signals to a processor, the processor configured to detect intensity variation in said one or more light beams based on the signals, wherein when the apparatus is operated in the first mode, the intensity variation is indicative of placing of one or more objects on the first surface, and when the apparatus is operated in second mode, the intensity variation is indicative of content on an item placed on the first surface.

16. The method of claim 15, wherein the facet comprises a slanted facet located at a corner of the light guide, and the optical sensing module is optically coupled to the slanted facet, wherein said method comprises diffracting the light beam by the diffractive element and guiding the light beam in light guide, so that the diffracted light beam exits the slanted facet and the exiting angle is indicative of a distance between said location and the reference point at said corner.

17. The method of claim 16, wherein when an object is present at said location on the first surface, intensity of the exit beam is caused to change, and wherein the optical sensing module is configured to detect the exit beam having the exiting angle and the change in the intensity of the exit beam, and the signals provided to the processor are indicative of the exiting angle and the change in the intensity of the exit beam, said method further comprising; configuring the processor to determine said location and presence of the object at said location based on the signals.

18. The method of claim 17, wherein when the apparatus is operated in the first mode, the processor is configured to determine presence of the one or more objects at one or more locations on the first surface.

19. The method of claim 18, further comprising:
configuring the processor to determine the one or more locations in a time sequence so as to detect changes in said one or more locations responsive to movement of said one or more objects, and determining the movement of said one or more objects.

20. A method, comprising: providing a light guide in an apparatus operable in a first mode and in a second mode, the light guide having a first surface and an opposing second surface; optically coupling an optical sensing module to the light guide for sensing light from the light guide and for providing signals indicative of one or more light beams emerging from the light guide between the first surface and the second surface; and providing the signals to a processor, the processor configured to detect intensity variation in said one or more light beams based on the signals, wherein when the apparatus is operated in the first mode, the intensity variation is indicative of placing of one Cr more objects on the first surface, and when the apparatus is operated in the second mode, the intensity variation is indicative of content on an item placed on the first surface, the light beam is indicative of intensity variations in light directed from a plurality of locations on the first surface, and the signals are indicative of said intensity variations, said method further comprising:
configuring the processor for determining the content of the item based on the signals and for forming an image of the content of the item.

* * * * *

UNITED STATES PATENT AND TRADEMARK OFFICE
CERTIFICATE OF CORRECTION

PATENT NO. : 8,629,855 B2
APPLICATION NO. : 12/744952
DATED : January 14, 2014
INVENTOR(S) : Seppo Pienimaa and Kong Qiao Wang It is certified that error appears in the above-identified patent and that said Letters Patent is hereby corrected as shown below:

IN THE CLAIMS:

In Claim 1: Column 10, line 52, delete "redefined" and replace with --predefined--.

In Claim 2: Column 11, line 4, after "wherein" delete "the".

In Claim 20: Column 12, line 55, delete "Cr" and replace with --or--.

Signed and Sealed this
Twenty-fifth Day of March, 2014

Michelle K. Lee
*Deputy Director of the United States Patent and Trademark Office*